United States Patent [19]

Moen

[11] 4,148,438

[45] Apr. 10, 1979

[54] ANTI-SIPHON SPRAY HEAD

[75] Inventor: Alfred M. Moen, Grafton, Ohio

[73] Assignee: Stanadyne, Inc., Windsor, Conn.

[21] Appl. No.: 853,235

[22] Filed: Nov. 21, 1977

Related U.S. Application Data

[63] Continuation-in-part of Ser. No. 837,428, Sep. 28, 1977, which is a continuation-in-part of Ser. No. 677,323, Apr. 15, 1976, abandoned.

[51] Int. Cl.$^2$ ............................ B05B 1/14; F16K 7/07
[52] U.S. Cl. .................................... 239/571; 239/562; 239/583; 137/853
[58] Field of Search ............... 239/526, 530, 558, 562, 239/570, 571, 583; 137/853

[56] References Cited

U.S. PATENT DOCUMENTS

| | | | |
|---|---|---|---|
| 3,416,567 | 12/1968 | Dardel et al. | 137/853 X |
| 3,498,546 | 3/1970 | Logan et al. | 239/583 |
| 3,708,207 | 1/1973 | Steele | 137/853 X |

*Primary Examiner*—Robert W. Saifer
*Attorney, Agent, or Firm*—Kinzer, Plyer, Dorn & McEachran

[57] ABSTRACT

An anti-siphon spray head has a housing and a chamber within the housing. An inlet and a plurality of spray openings communicate with the chamber. There is a flexible sleeve positioned within the chamber which masks the inlet to form an anti-siphon closure therewith. A movable valve member positioned within the chamber and within the flexible sleeve controls the flow of water from the inlet to the spray openings. There are means on the valve member which are in sealing contact with the flexible sleeve when the valve member is in a closed position.

10 Claims, 9 Drawing Figures

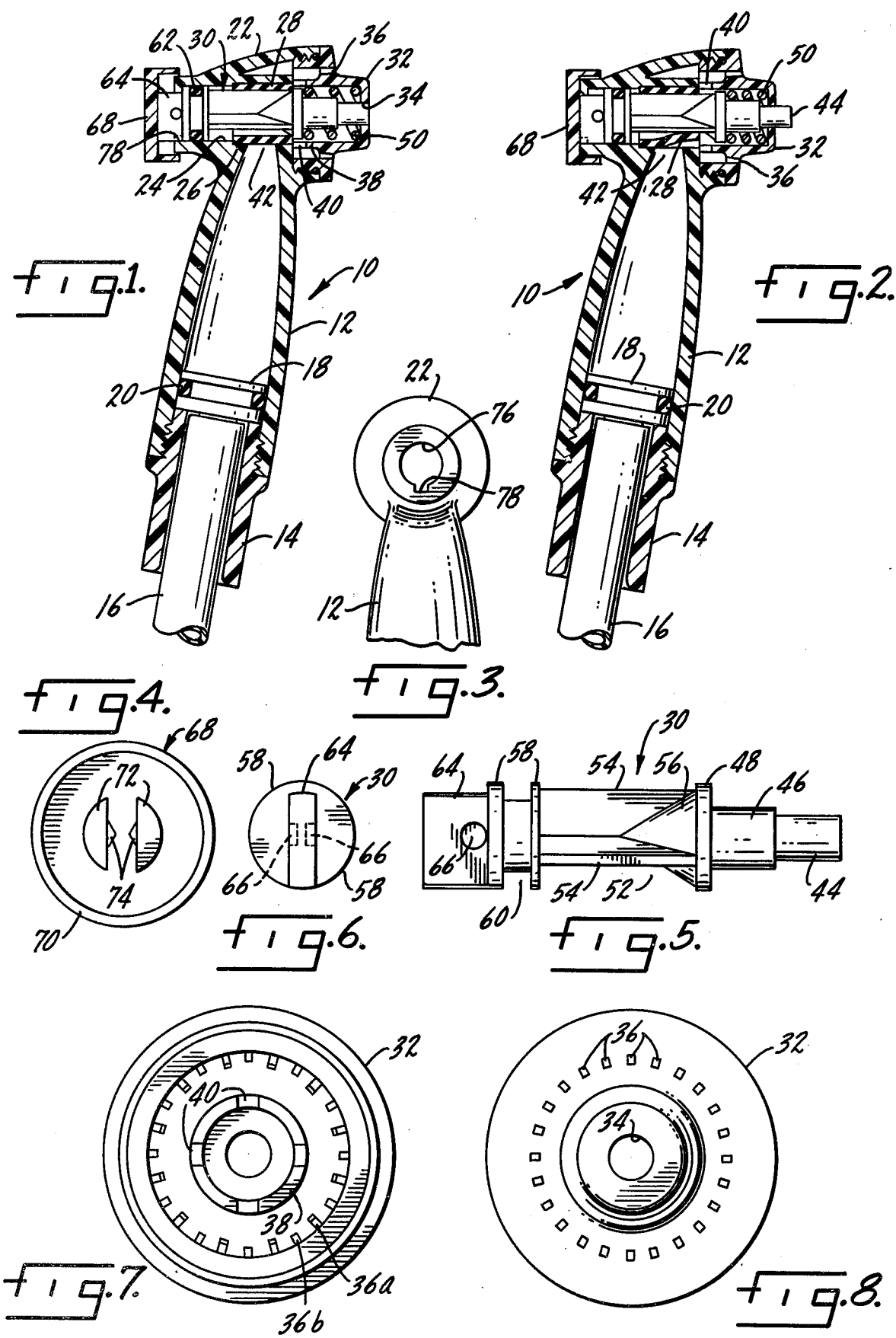

ANTI-SIPHON SPRAY HEAD

This application is a continuation-in-part of copending application Ser. No. 837,428 filed Sept. 28, 1977, which is a continuation-in-part of my prior application Ser. No. 677,323 filed Apr. 15, 1976, now abandoned.

SUMMARY OF THE INVENTION

The present invention relates to spray heads of the type commonly used as a kitchen sink accessory and particularly relates to such a spray head which prevents the backflow of water to the spray inlet.

A primary purpose is an anti-siphon spray head which is simple in construction and reliably operable.

Another purpose is a spray head of the type described utilizing a flexible sleeve to both form a seal with a movable valve member, controlling the normal passage of water from the spray head, and to form a seal with the spray head inlet preventing the backflow of water.

Another purpose is an anti-siphon spray head of the type described in which a flexible sleeve provides dual sealing functions.

Another purpose is a unique method of attaching an operating lever to a spray head which prevents removal thereof.

Other purposes will appear in the ensuing specification, drawings and claims.

BRIEF DESCRIPTION OF THE DRAWINGS

The invention is illustrated diagrammatically in the following drawings wherein:

FIG. 1 is an axial section showing the spray head in a closed position,

FIG. 2 is an axial section showing the spray head in an open position,

FIG. 3 is an end view of the spray head,

FIG. 4 is an enlarged end view of the spray head actuator,

FIG. 5 is a side view of the valve member,

FIG. 6 is an end view of the valve member,

FIG. 7 is an end view of the inside of the spray cap,

FIG. 8 is an end view of the outside of the spray cap, and

DESCRIPTION OF THE PREFERRED EMBODIMENT

Figure 9:
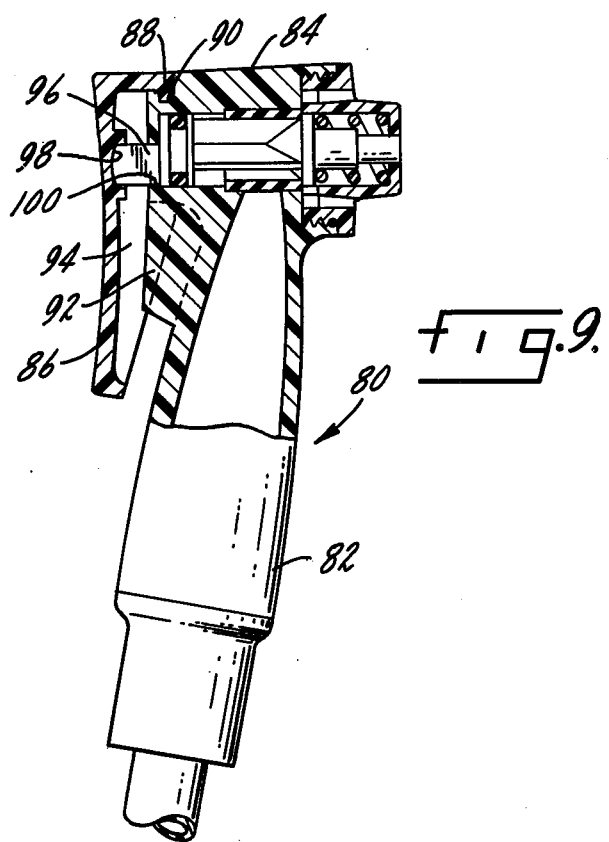
FIG. 9 is a partial axial section of a modified form of the invention.

The spray head of the present application is customarily used as an accessory at a kitchen sink. However, the basic structure and principles disclosed herein have wider application and should not be limited to that particular use.

A housing indicated generally at 10 has a handle portion 12 which is threadedly attached to an adapter 14 which holds a flexible water supply tube 16. A plug 18 is attached at the end of supply tube 16 and may have a seal ring 20 in contact with the interior of handle portion 12. The tapered interior of handle portion 12 and adapter 14 combine to fix the position of the supply tube relative to the handle.

Housing 10 has a spray head housing portion 22 with an interior chamber 24. An annular shoulder 26 within chamber 24 seats a flexible rubber sleeve 28. Positioned within chamber 24 and within flexible sleeve 28 is a valve member 30 shown in detail in FIGS. 5 and 6.

One end of chamber 24 is closed by a spray cap 32 illustrated in detail in FIGS. 7 and 8. Spray cap 32 has a coaxial or central opening 34 which will receive a portion of valve member or valve stem 30 and a series of coaxial spaced spray discharge openings 36. As illustrated in FIG. 7, the discharge openings may be formed at varying angles so that the spray discharge is in the general shape of a cone. For example, adjacent openings 36a and 36b will provide water streams at differing angles. Spray cap 32 has a generally cylindrical portion 38 interiorly of spray openings 36 which cylindrical portion has four generally uniformly spaced notches 40 which function as water passages to direct water to the spray openings.

Formed at the junction between handle portion 12 and spray head housing portion 22 is an inlet 42 which is masked by flexible sleeve 28.

Valve member 30 has a small cylindrical portion 44 which will extend outwardly through spray cap opening 34 when the spray head is in the operated position of FIG. 2. Adjacent cylindrical portion 44 is a portion of slightly larger diameter 46 and an annular shoulder 48. Cylindrical portion 46 supports a coil spring 50 positioned within spray cap cylindrical portion 38, which spring is effective to urge the valve member to the closed position of FIG. 1. Opposite ends of spring 50 seat against the interior of spray cap 32 and against shoulder 48. When the valve is in the closed position of FIG. 1, shoulder 48 forms a seal with the end of flexible sleeve 28, thereby forming the closure between inlet 42 and discharge openings 36.

Adjacent shoulder 48 is a valve control portion 52 which may have three generally uniformly spaced outwardly extending vanes 54 which terminate at one end in a conical portion 56. The opposite ends of the vanes terminate in a shoulder 58 having a seal ring groove 60. As particularly shown in FIGS. 1 and 2, a seal ring 62 is positioned in groove 60 and is in sealing relationship with the interior of spray head housing portion 22. The valve member is completed by a flattened area 64 having circular recesses 66 on opposite sides thereof. Flattened area 64 extends outwardly through the left-hand open end of spray head housing portion.

An actuator 68 (FIG. 4) has a cylinderical flange 70 and a pair of spaced generally semicircular projections 72, each of which have inwardly-directed points 74. When actuator 68 is assembled on flattened area 64, points 74 fit within recesses 66 as the flattened area is positioned between semicircular projections 72, thus firmly attaching the actuator to the valve member. Looking particularly at FIG. 3, which shows the left side of spray head housing 22, open end 76 may have a small keyway 78 which will receive the lower end of flattened area 64 to maintain alignment of the valve member during operation.

FIG. 1 illustrates the closed position of the spray head. There is a closing seal formed between the annular end of flexible sleeve 28 and shoulder 48, thus preventing water from within housing 10 reaching spray discharge openings 36. Although water pressure within the housing or handle may to some degree force the flexible sleeve inwardly upon vanes 54 and to some degree upon conical portion 56, such water cannot pass by the seal between the shoulder and the end of flexible sleeve 28.

When the valve is opened, as shown in FIG. 2, flexible sleeve 28 will collapse inwardly, permitting water to pass from inlet 42 and through discharge slots 40 to spray openings 36. Movement of the valve member or stem to the position of FIG. 2, caused by pressure upon actuator 68, will clear shoulder 48 away from the end end flexible sleeve 28, thus opening the aforedescribed seal.

Of particular importance is the fact that any vacuum created in the supply line or supply tube 16, will immediately cause flexible sleeve 28 to seal upon inlet 42, thus preventing any backflow of water from the spray head into the water supply. Because the flexible sleeve 28 masks inlet 42, it is impossible for any water flowing from discharge openings 36 toward inlet 42 to actually pass through the inlet.

In the modified structure of FIG. 9 a housing 80 includes a handle portion 82 and a spray head housing portion 84. A lever 86 is attached to spray head portion 84 by means of lever projection 88 and a cooperating groove 90 on the spray head housing portion. Handle portion 82 has a key 92 which extends into a groove 94 on the lever to align the handle and lever during operation.

The valve member in the structure of FIG. 9 may be the same as described above with the exception of an outwardly extending rectangular projection 96 which fits within a mating socket 98 on the inside of lever 86. Projection 96 will extend through an appropriately sized and shaped opening 100 in the adjacent portion of housing 84.

The operation of the structure of FIG. 9 is the same as described above. However, the assembly is slightly different and prevents removal of the lever from the housing during operation. First, the lever is attached to the housing by means of the cooperating projection 88 and groove 90. The valve and its associated projection 96 are then inserted from the front of the spray head with projection 96 extending through opening 100 and into socket 98. When so assembled the lever can only move back and forth in the proper manner. Key 92 and the described projection and groove prevent removal of the lever as well as misaligning relative rotation between the lever and spray head.

The entire structure is simple, reliable and easily operated. The housing and the valve member may conveniently be formed of a suitable plastic, for example Celcon, as may actuator 68. The flexible sleeve, which is an easily replaceable item if it becomes worn, performs the dual function of sealing against water flowing to the discharge, as well as preventing back siphonage from the spray head into the water system.

Whereas the preferred form of the invention has been shown and described herein, it should be realized that there may be many modifications, substitutions and alterations thereto.

The embodiments of the invention in which an exclusive property or privilege is claimed are defined as follows:

1. An anti-siphon spray head including a housing, a chamber in said housing, a plurality of spray openings in said housing in communication with said chamber, an inlet in said housing, a flexible sleeve positioned within said chamber and masking said inlet to form a seal therewith preventing the flow of water from said spray openings to said inlet, a movable valve member within said chamber for controlling the flow of water from said inlet to said spray openings, and means on said valve member in sealing contact with said flexible sleeve when said valve member is in a closed position.

2. the structure of claim 1 further characterized in that said valve member is positioned within said flexible sleeve and has an annular portion in sealing contact with an end of said flexible sleeve.

3. The structure of claim 2 further characterized by and including an annular shoulder formed about said chamber, with said flexible sleeve being seated against said shoulder.

4. The structure of claim 1 further characterized by and including a spring within said housing urging said valve member toward said closed position, preventing communication between said inlet and said spray openings.

5. The structure of claim 4 further characterized in that said valve member has a portion extending outwardly of said housing, pressure applied to said outwardly extending portion moving said valve member against said spring to an open position in which there is communication between said inlet and spray openings.

6. The structure of claim 1 further characterized in that said chamber is open at opposite ends, said valve member being coaxially movable with said chamber and having portions arranged to extend outwardly from said opposite open ends, a spring within said chamber and urging said valve member toward said closed position, the application of pressure from outside of said housing, upon one of said valve member portions, causing said valve member to move from said closed position to an open position in which there is communication between said spray openings and said inlet.

7. The structure of claim 6 further characterized in that said spray openings are arranged coaxially about said reciprocally movable valve member.

8. The structure of claim 1 further characterized by and including a lever pivotally mounted on said housing and in pressure-applying relation with said valve member.

9. The structure of claim 8 further characterized by and including cooperating key means on said housing and lever for maintaining alignment therebetween.

10. The structure of claim 8 further characterized in that said valve member includes a projection extending outwardly from said housing, a socket on said lever receiving said projection.

* * * * *